UNITED STATES PATENT OFFICE.

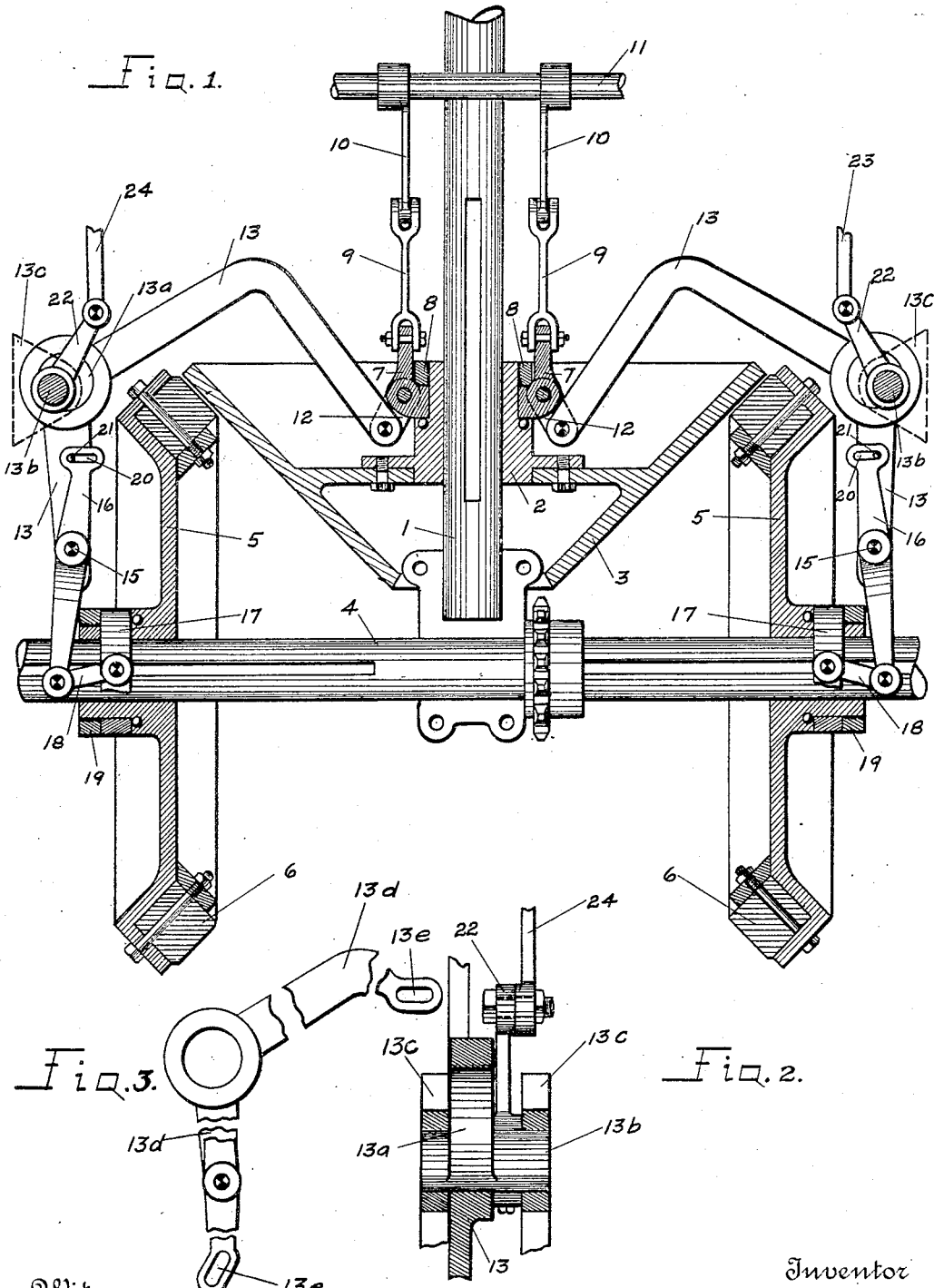

GEORGE H. CHISHOLM, OF SUTTER CREEK, CALIFORNIA.

FRICTION-GEARING.

941,856.         Specification of Letters Patent.     Patented Nov. 30, 1909.

Application filed February 11, 1909. Serial No. 477,350.

*To all whom it may concern:*

Be it known that I, GEORGE H. CHISHOLM, a citizen of the United States, residing at Sutter Creek, in the county of Amador, State of California, have invented certain new and useful Improvements in Friction-Gearing; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in driving gears or vehicles and particularly motor vehicles of all kinds, the particular mechanism improved upon being for the transmission of power, the object of the invention being to produce a friction driving mechanism which will have a true rolling contact between the driving and driven friction surfaces clear across such surfaces regardless of position, thus overcoming the objection to the present much used disk style of friction transmission mechanism on account of the constant slippage caused by the different peripheral speeds at point of contact. The greatest use for my mechanism would be to take the place of the sliding gear transmission mechanism and other speed changing gearing now used for automobiles.

A further object of the invention is to produce a simple, inexpensive and easily operated device for the purpose.

These objects I accomplish by means of an aluminum or cast iron cone with a paper faced beveled wheel on each side to bear on said center cone for friction driving, all three of said members being linked together so that when said center cone is moved backward or forward, the said wheels will correspondingly move in and out thus maintaining the same spaced distance with relation to each other, each wheel having also a separate operating pedal to bring one to bear upon the said cone regardless of the other for the purpose of giving the forward or reverse movement to the vehicle as desired. The speed of the vehicle is changed by changing the point of contact of the wheels on the cone, as described. I also employ such necessary structure and relative arrangement of parts as will more fully appear by a perusal of the following specification and claims.

In the drawings similar characters of reference indicate corresponding parts in the several views.

Figure 1 is a longitudinal section of my complete mechanism. Fig. 2 is a sectional view of a double lever fulcrum mechanism. Fig. 3 is a view showing a modified form of bell crank from that shown in Fig. 1.

Referring now more particularly to the characters of reference on the drawings 1 designates the main driving shaft from the engine, slidably keyed to which is a hub 2 to which is bolted an aluminum or cast iron cone 3.

4 is the transmission shaft disposed at right angles to the shaft 1 and on which are mounted two wheels 5 having paper fiber faces 6 adapted to contact with the cone 3 under certain conditions as will appear, the said wheels 5 being spaced slightly from the cone 3 when not in operation.

On the hub 2 is a yoke 7 maintained in position by a screw collar 8, there being links 9 connecting said yoke 7 with levers 10 on a rocking shaft 11 whereby the said shaft 11 can be operated to move the cone 3 backward or forward, the wheels 5 being simultaneously moved to maintain their same spaced distance from said cone in the following manner:—Links 12 connect the yoke 7 to bell cranks 13, fulcrumed at their centers on an eccentric 13$^a$ having eccentric pins 13$^b$ mounted in brackets 13$^c$, such cranks 13 being pivoted onto levers 16, at their outer ends as at 15, said levers 16 being linked at one end to yokes 17 on the wheels 5 by means of links 18, such yokes being maintained in position by means of screw collars 19. The other ends of the levers 16 are slotted as at 20 engageable on the bell cranks 13 with clamping bolts 21 whereby such levers 16 may be adjusted to maintain the predetermined relative position of the faces 6 with respect to the cone 3 when such faces 6 become worn. Keyed to the eccentric pins 13$^b$ are cranks 22, one being connected with the forward drive pedal by a rod 24, and the other to the reverse pedal by a rod 23. Thus as the cone 3 is moved backward by means of the yoke 7, the bell cranks 13 moving on their fulcrums 13ª, cause the levers 16 to drive the wheels 5 inward to the constant relative position with respect to the cone 3 and when the vehicle is to be driven forward or reversed, the proper pedal rod 23 or 24 is operated to cause the cranks 22 to cause the eccentric cranks 13ª—13ᵇ to drive the bell cranks 13 to operate the levers 16 to drive the wheels 5 into direct contact with the cone 3 for friction driving.

To provide against any undue loss of motion by reason of the wear on the paper face 6 I provide the mechanism 16—20—21 as described above, whereby the play or movement of said lever 16 may be adjusted to keep the surface 6 always at the necessary point of contact with the cone 3.

If desired the form of bell crank shown in Fig. 3 may be used. In this view the bell crank 13ᵈ has a slot 13ᵉ in each end to work over pins on the yokes 7 and 17 to replace the links 12 and 18.

From the foregoing description it will be readily seen that the same true rolling contact, clear across contact surfaces is maintained between the cone 3 and wheels 5 no matter at what point on said cone 3 the friction contact is made and thus the main object of the invention as set forth herein is substantially fulfilled.

Having thus described my invention what I claim as new and useful and desire to secure by Letters Patent is:—

1. A friction gearing comprising a driving shaft and a driven shaft, a cone slidable on said driving shaft, two cones slidable on said driven shaft, and means movable with said first named cone, whereby when said cone is moved, said second named cones will both be simultaneously moved toward each other.

2. A friction gearing comprising a driving shaft and a driven shaft, a cone movable on said driving shaft, two cones movable on said driven shaft spaced on each side of said first named cone, and bell cranks linked to said first named cones and to said second named cones.

3. A friction gearing comprising a driving shaft and a driven shaft, a cone movable on said driving shaft two cones movable on said driven shaft spaced on each side of said first named cone, bell cranks linked to said first named cone and to second named cones, and means connected with said bell cranks to operate them to move said last named cones independently of any movement of said first named cone.

In testimony whereof I affix my signature in presence of two witnesses.

GEORGE H. CHISHOLM.

Witnesses:
H. H. SIEBE,
D. V. RAMAZZOTT.